United States Patent
Park

(10) Patent No.: US 8,604,648 B2
(45) Date of Patent: Dec. 10, 2013

(54) FLAT SPRING AND VOICE COIL MOTOR USING THE SAME

(75) Inventor: Sangok Park, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 338 days.

(21) Appl. No.: 12/986,434

(22) Filed: Jan. 7, 2011

(65) Prior Publication Data

US 2011/0169348 A1    Jul. 14, 2011

(30) Foreign Application Priority Data

Jan. 8, 2010 (KR) .................. 10-2010-0001737

(51) Int. Cl.
*H02K 41/00* (2006.01)
*F16F 3/00* (2006.01)

(52) U.S. Cl.
USPC .......................................... 310/15; 267/158

(58) Field of Classification Search
USPC ......... 359/814, 822–824; 310/15, 16; 267/93, 267/158
See application file for complete search history.

(56) References Cited

U.S. PATENT DOCUMENTS

| | | | |
|---|---|---|---|
| 7,663,818 B2* | 2/2010 | Chung | 359/814 |
| 7,663,823 B2* | 2/2010 | Chung | 359/824 |
| 7,706,088 B2* | 4/2010 | Chung | 359/823 |
| 7,952,822 B2* | 5/2011 | Lai et al. | 359/824 |
| 2007/0097527 A1* | 5/2007 | Ichikawa et al. | 359/819 |
| 2008/0259467 A1* | 10/2008 | Chung | 359/814 |
| 2008/0259468 A1* | 10/2008 | Chung | 359/814 |
| 2008/0259470 A1* | 10/2008 | Chung | 359/823 |
| 2009/0085425 A1* | 4/2009 | Chang | 310/273 |
| 2010/0172041 A1* | 7/2010 | Lai et al. | 359/824 |
| 2010/0213649 A1* | 8/2010 | Lee et al. | 267/93 |

* cited by examiner

*Primary Examiner* — Tran Nguyen
(74) *Attorney, Agent, or Firm* — Saliwanchik, Lloyd & Eisenschenk

(57) ABSTRACT

A flat spring for a voice coil motor includes an curved internal flat spring, an outer flat spring placed outward the internal flat spring, a first connection body folded at least twice and interposed between the internal flat spring and the outer flat spring, a second connection body placed between the internal flat spring and the outer flat spring in parallel with the first connection body and having an identical shape with the first connection body, and a connection flat spring including a connecting part connecting adjacent ends of the first and the second connection body, where an end of the first connection body which has no connection with the connecting part is connected to the internal flat spring, and an end of the second connection body which has no connection with the connecting part is connected to the outer flat spring.

12 Claims, 3 Drawing Sheets

FLAT SPRING AND VOICE COIL MOTOR USING THE SAME

CROSS-REFERENCE TO RELATED APPLICATION

This application claims the benefit under 35 U.S.C. §119 of Korean Application No. 10-2010-0001737, filed Jan. 8, 2010, which is hereby incorporated by reference in its entirety.

BACKGROUND OF THE DISCLOSURE

1. Field of the Invention

The present disclosure relates to a flat spring for a voice coil motor and a voice coil motor using the same.

2. Discussion of the Related Art

Recently, various optical devices such as a miniature digital camera on a mobile phone or a high resolution digital camera are developed.

In a case of the miniature digital camera on the mobile phone, a distance between an image sensor for adjusting a focal point and a lens adjusting a distance to a lens or magnification was unable to be controlled in a conventional technology. But recently an actuator adjusting the distance between the image sensor and the lens such as a voice coil motor is developed to adjust the function.

The voice coil motor includes a bobbin storing the lens and a flat spring elastically supporting the bobbin. The flat spring is produced by pressing or etching an extremely thin metal plate. Performance of the flat spring has a great effect on performance of the voice coil motor.

The flat spring receives a repetitive stress from drive of the bobbin, thus durability of the flat spring is greatly decreased as a result of the repetitive drive of the bobbin.

BRIEF SUMMARY

The present invention is directed to provide a flat spring for a voice coil motor elastically supporting a bobbin storing a lens, preventing a fatigue failure from a repetitive stress and external shock or oscillation.

The present invention also provides a voice coil motor including the flat spring above.

In one general aspect of the present invention, there is provided a flat spring for a voice coil motor, comprising; a curved internal flat spring; an outer flat spring placed outward the internal flat spring; a first connection body folded at least twice and interposed between the internal flat spring and the outer flat spring; a second connection body placed between the internal flat spring and the outer flat spring in parallel with the first connection body and formed with an identical shape with that of the first connection body; and a connection flat spring including a connecting part connecting adjacent ends of the first and the second connection body. An end of the first connection body having no connection with the connecting part is connected to the internal flat spring, and an end of the second connection body having no connection with the connecting part is connected to the outer flat spring.

In some exemplary embodiments of the present invention, there is provided a voice coil motor, comprising: a base plate; a stator placed on the base plate; a rotor placed inward the stator for generating a vertical displacement by an action with the stator; and a flat spring elastically coupled with the rotor. The flat spring including an curved internal flat spring; an outer flat spring placed outward the internal flat spring; a first connection body folded at least twice and interposed between the internal flat spring and the outer flat spring; a second connection body placed between the internal flat spring and the outer flat spring in parallel with the first connection body and having an identical shape with that of the first connection body; and a connection flat spring including a connecting part connecting adjacent ends of the first and the second connection body. An end of the first connection body which has no connection with the connecting part is connected to the internal flat spring, and an end of the second connection body which has no connection with the connecting part is connected to the outer flat spring.

DETAILED DESCRIPTION OF THE INVENTION

Figure 1:
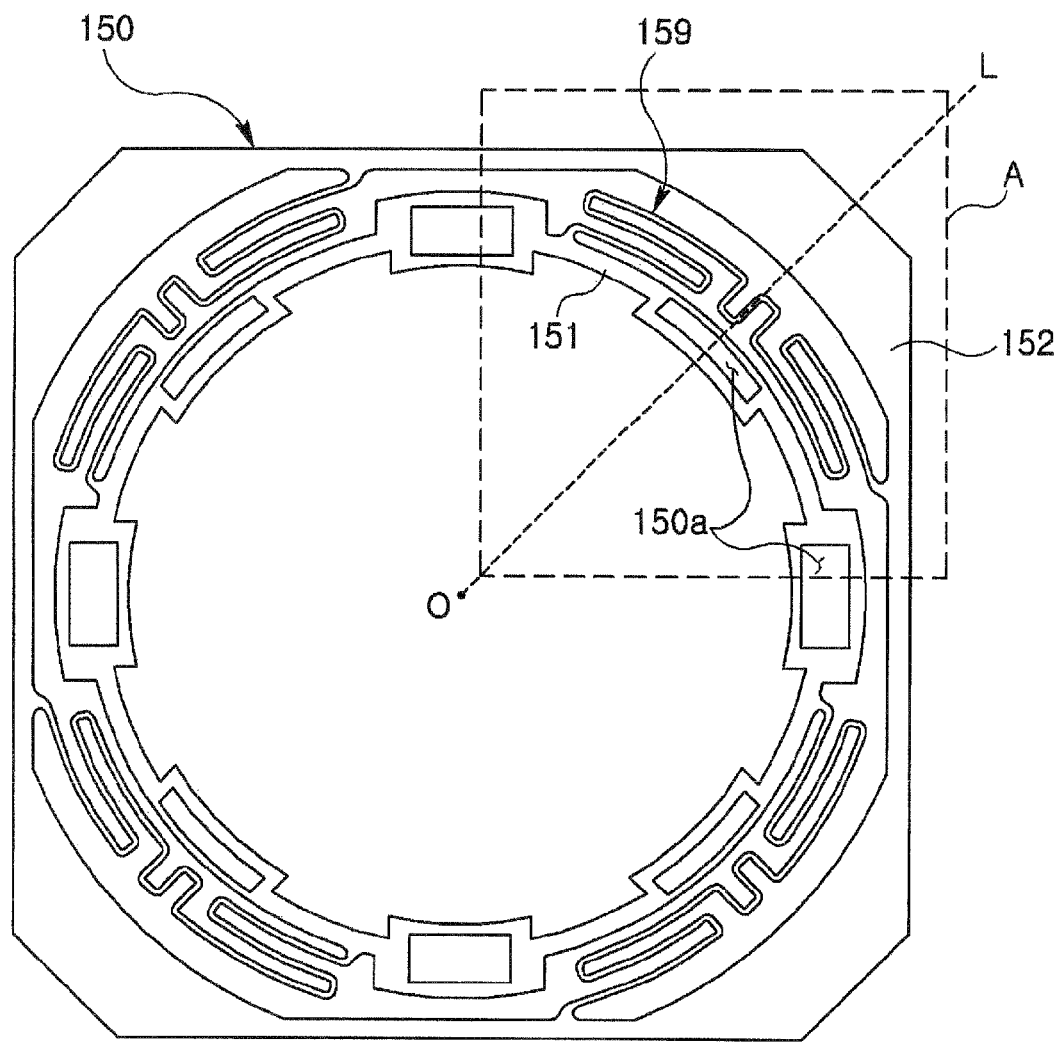
FIG. 1 is a plane illustrating a flat spring for a voice coil motor according to an exemplary embodiment of the present invention.
Figure 2:
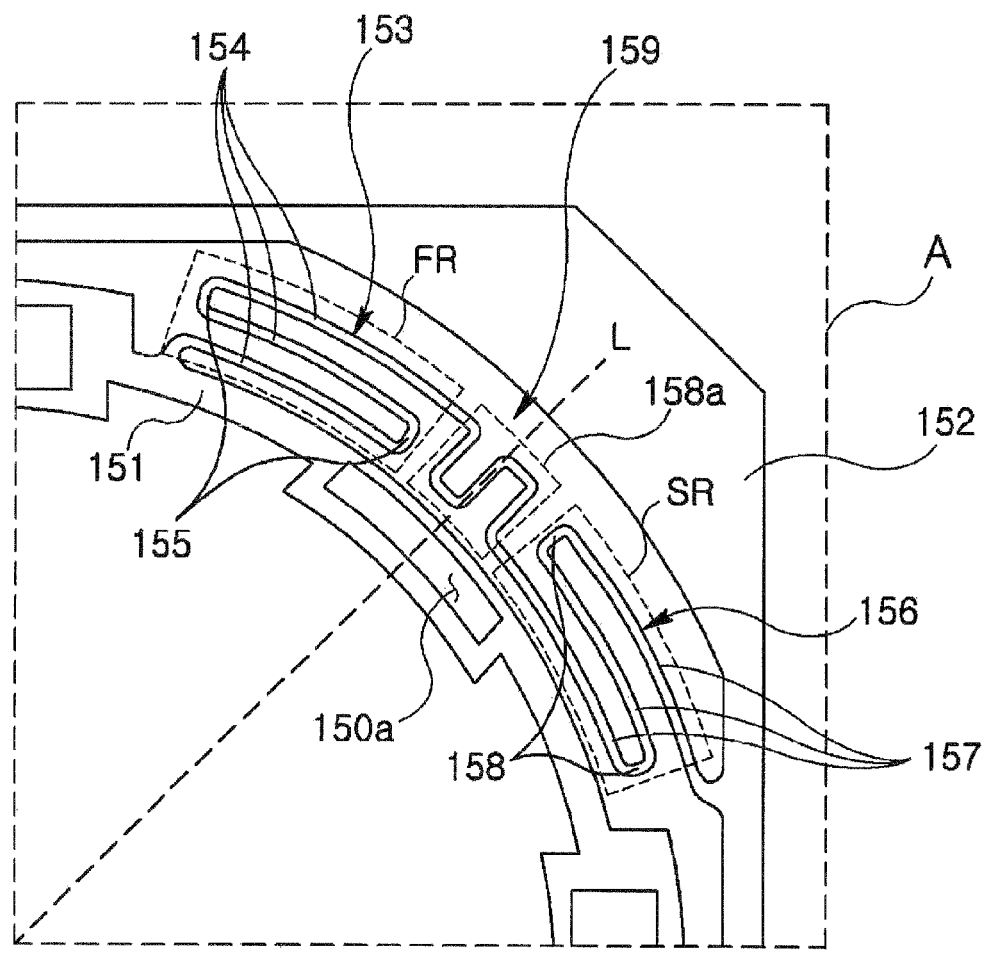
FIG. 2 is a partially enlarged view of 'A' of FIG. 1.

FIG. 1 is a plane illustrating a flat spring for a voice coil motor according to an exemplary embodiment of the present invention. FIG. 2 is a partially enlarged view of 'A' of FIG. 1.

With reference to FIGS. 1 and 2, the flat spring for the voice coil motor(150) includes an internal flat spring(151), an outer flat spring(152) and a connection flat spring(159). The flat spring for the voice coil motor(150) may be an upper flat spring of the voice coil motor.

The internal flat spring(151) may take the curved shape when viewed from a plain surface. The internal flat spring (151) may elastically support an upper part of a bobbin which is rotor of the voice coil motor.

More specifically, the internal flat spring(151) may take the ringed shape when viewed from a plain surface, and the internal flat spring(151) may have a connection hole(150*a*) in order to be coupled with at least one boss of the bobbin. The internal flat spring(151) may be a thin metal plate with a width in the range of 30 μm~50 μm. The connection hole (150*a*) and a connecting part (158*a*. described later) are oppositely formed in a radial direction of the internal flat spring (151).

The outer flat spring(152) is placed outward of the internal flat spring(151), and the outer flat spring(152) has more large circular opening than the internal flat spring(151). The outer flat spring(152) has the opening adapted to form the internal flat spring(151) on a thin square metal plate.

The connection flat spring(159) includes a first connection body(153), a second connection body(156) and a connecting part(158*a*).

The connection flat spring(159) is interposed between the internal flat spring(151) and the outer flat spring(152), and the connection flat spring(159) connects the internal flat spring (151) and the outer flat spring(152). Each distal end respectively connected to the internal flat spring (151) and the outer flat spring (152) among the connection flat spring (159) is farthest formed from the connection flat spring (159).

A first region(FR) and a second region(SR) placed in parallel with the first region(FR) is arranged in a space formed between the internal flat spring(151) and the outer flat spring (152).

With reference to FIG. 1, the first region(FR) and the second region(SR) are arranged on either side of the imaginary base line(L) extended from a center(O) of the internal flat spring(151) to the outer flat spring(152).

In some exemplary embodiments of the present invention, the first region(FR) and the second region(SR) arranged on either side of the imaginary base line(L) have substantially same area. The imaginary base line(L) bisects the area of the first region(FR) and the second region(SR).

The first connection body(153) is interposed at a space between the internal flat spring(151) and the outer flat spring (152), and is disposed, for example, at the first region(FR).

The first connection body(153) is connected to the internal flat spring(151), and bent at least twice. A connecting part between the internal flat spring (151) and the first connection body(153) is formed at one lateral margin of the connection flat spring (159).

The first connection body(153) arranged at the first region (FR) includes first parallel parts(154) and first curved parts (155).

The first parallel part(154) has substantially same curvature with the internal flat spring(151). The number of first parallel parts(154) may be m (m is odd number more than 3). The number of first parallel parts(154) of the first connection body(153) may be 3 or 5. In the case of the embodiment, each first parallel parts(154) have same curvature, and a distance between each first parallel parts(154) are substantially same.

First curved parts(155) are connected with ends of each first parallel parts(154) to make first parallel parts(154) connected in series. The number of first parallel parts(154) is odd number more than 3. The number of first curved parts(155) may be n (n is even number more than 2) when the number of first parallel parts(154) is m. For example, two first curved parts(155) are formed when the number of first parallel parts (154) is 3; four first curved parts(155) are formed when the number of first parallel parts(154) is 5.

On account of at least three first parallel parts(154) and two first curved parts(155) connected with the ends of the first parallel parts(154), the first connection body(153) has similar form as 'S' shape when viewed from a plain surface.

In the case of the embodiment, the first connection body (153) formed with first parallel parts(154) and first curved parts(155) has designated length. The end of the first connection body(153) adjacent to the internal flat spring(151) is connected in one body with the internal flat spring(151).

The second connection body(156) is interposed in the space between the internal flat spring(151) and the outer flat spring(152); may be in the second region(SR). In the case of the embodiment, the second connection body(156) arranged in the second region(SR) has substantially same shape and size with the first connection body(153).

The second connection body(156) is connected to the outer flat spring(152), and bent at least twice. A connecting part between the outer flat spring (152) and the second connection body(156) is formed at the other lateral margin of the connection flat spring (159).

More specifically, the second connection body(156) arranged in the second region(SR) includes second parallel parts(157) and second curved parts(158).

The second parallel part(157) has substantially same curvature with the internal flat spring(151). The number of second parallel parts(157) may be m (m is odd number more than 3). The number of second parallel parts(157) of the second connection body(156) may be 3 or 5. In the case of the embodiment, each second parallel parts(157) have same curvature, and a distance between each second parallel parts (157) are substantially same.

Second curved parts(158) are connected with ends of each second parallel parts(157) to make second parallel parts(157) connected in series. The number of second parallel parts(157) is odd number more than 3. The number of second curved parts(158) may be n (n is even number more than 2) when the number of second parallel parts(157) is m. For example, two second curved parts(158) are formed when the number of second parallel parts(157) is 3; four second curved parts(158) are formed when the number of second parallel parts(157) is 5.

On account of at least three second parallel parts(157) and two second curved parts(158) connected with the ends of the second parallel parts(157), the second connection body(156) has similar form to a lengthwise elongated letter 'S' when viewed from a plain surface.

In the case of the present embodiment, the second connection body(156) formed with second parallel parts(157) and second curved parts(158) has the same length. A distal end of the second connection body(156) adjacent to the internal flat spring(152) is integrally connected to the internal flat spring (152).

In the present embodiment of the present disclosure, the first connection body(153) and the second connection body (156) are arranged in parallel along a circumferential direction of the internal flat spring (151). Meanwhile, a sum of lengths of the first curved parts(155) at the first connection body(153), and a sum of lengths of the second curved parts (158) at the second connection body (156) are same.

The connecting part(158a) is formed at the space between the internal flat spring(151) and the outer flat spring(152). The connecting part(158a) connects the end of the first connection body(153).

The connecting part(158a) is formed in the space between the internal flat spring(151) and the outer flat spring(152). The connecting part(158a) connects an end of the first connection body(153) which has no connection with the internal flat spring(151) and an end of the second connection body (156) which has no connection with the outer flat spring(152). In the case of the embodiment, the first connection body (153), the second connection body(156) and the connecting part(158a) are integrally connected. That is, the connecting part(158a) connects the first connection body(153) and the second connection body(156).

The connecting part(158a) may have at least one fold in order to connect the first connection body(153) and the second connection body(156); the first connection body(153) and the second connection body(156) are folded at least once, thus each of the first connection body(153) and the second connection body(156) may take the shape similar to a letter 'S' when viewed from a plain surface. In the case of the embodiment, each of the connecting parts(158a) is folded twice.

In the case of the embodiment, the first connection body (153), the second connection body(156) and the connecting part(158a) are explained separately to help clear the explanation of the flat spring for the voice coil motor(150), however the flat spring for the voice coil motor(150) is formed from the thin metal plate with press work or etching work; thus the internal flat spring(151), the outer flat spring(152) and the connection flat spring(159) are formed as a whole.

Also, in the case of the embodiment, the connection flat springs(159) may be arranged in the space between the internal flat spring(151) and the outer flat spring(152) with four units with same interval.

Also, in the case of the embodiment, the first connection body(153) is connected with the internal flat spring(151) corresponds to the first region(FR) as one body and the second connection body(156) is connected with the outer flat spring(152) corresponds to the second region(SR) as one body, accordingly stress force is dispersed and fatigue failure of the connection flat spring(159) can be prevented.

In the case of the embodiment above the upper flat spring of the voice coil motor is explained for example, but a bottom flat spring of the voice coil motor may be applied using the structure of the flat spring explained with referring to FIG. 1 and FIG. 2.

Figure 3:
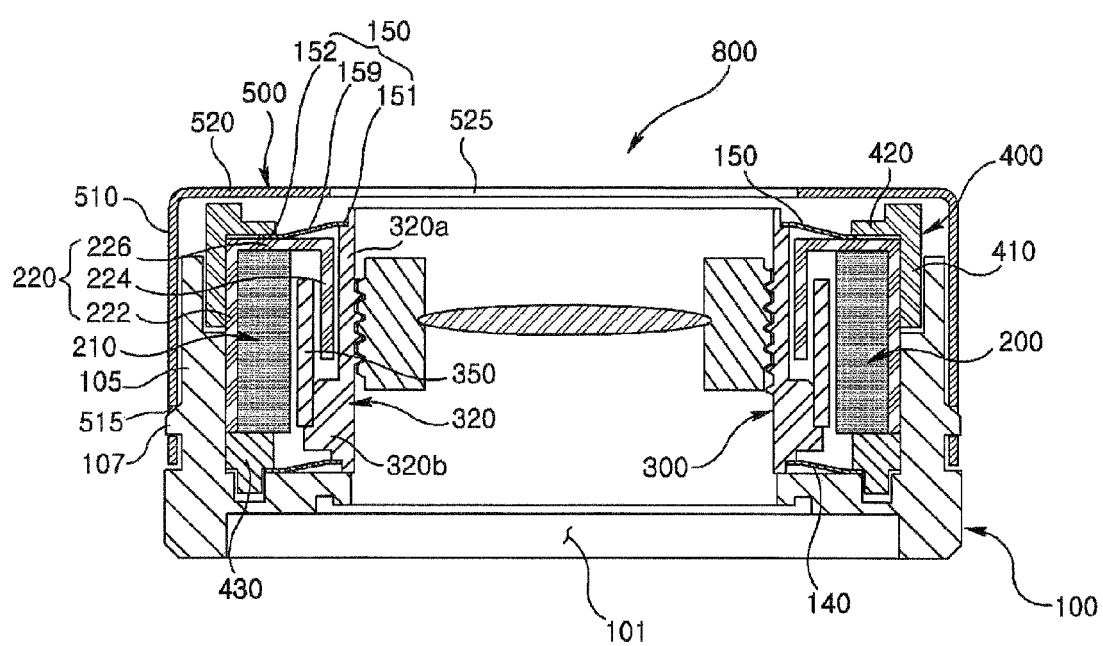
FIG. 3 is a sectional view illustrating a voice coil motor according to an exemplary embodiment of the present invention.

FIG. 3 is a sectional view illustrating a voice coil motor according to an exemplary embodiment of the present invention.

With referring to FIG. 3, a voice coil motor(800) includes a base(100), a stator(200), a rotor(300), an upper spacer(400), a bottom spacer(430), a case(500), the bottom flat spring (140) and the upper flat spring(150).

The base(100) may be manufactured in a square frame shape having an opening(101). On the other hand, the base (100) may have the various forms like a cylinder. In the case of the embodiment, the opening(101) may have the cylindrical shape when viewed from a plain surface.

In the case of the embodiment, the base(100) has a square frame shape and includes fixed pillars(105). For instance, fixed pillars(105) may arranged at the four edges of the upper side of the base(100). In the case of the embodiment, the fixed pillar(105) may be manufactured in various shapes such as trigonal prism, square pillar or cylinder.

The out side of the fixed pillar(105) includes a fixed processus(107) which has hook joining with the case(500, described later).

The stator(200) placed on the base(100) and includes a magnet(210) and a yoke(220).

The yoke(220) includes an outer yoke(222), an internal yoke(224) and a connection yoke(226) connects the upper side of the outer yoke(222) and the internal yoke(224).

The outer yoke(222) and the internal yoke(224) are arranged in parallel, and the connection yoke(226) connects the outer yoke(222) and the internal yoke(224). The internal yoke(224) has identical curvature with a coil of an rotor (described later).

The magnet(210) is attached on the in side of the outer yoke(222). The rear side of the magnet(210) and the outer yoke(222) may attached interactly by glue.

The front side of the magnet(210) corresponding to the rear side above is faced to the coil of the rotor(described later) and has same curvature with the coil.

The rotor(300) has a bobbin(320) and the coil(350).

The bobbin(320) stores a lens(not in figure) inside and has a cylindrical shape with top and bottom opened. In side of the bobbin(320) is fastened by a bolt with a lens case installing the lens.

An inside of the bobbin(320) corresponds to the opening (101) of the base(100) and has a uniform bore or a stair shape bore.

The bobbin(320) may have various forms such as a cylinder or a hexahedron. In the case of the embodiment, the bobbin(320) is manufactured in a cylindrical shape.

The bobbin(320) may include a first bobbin part(320a) and a second bobbin part(320b).

The first bobbin part(320a) formed as a first thickness when measured from the inside of the bobbin(320) which has uniform bore.

The second bobbin part(320b) formed as a second thickness which is thicker than the first thickness when measured from the in side of the bobbin(320) which has uniform bore. On the top out side of the second bobbin part(320b) stumbling block may be formed in order to secure the upper flat spring (150, described later).

An elevated platform is formed at the boundary of the first bobbin part(320a) whose thickness is first thickness and the second bobbin part(320b) whose thickness is second thickness thicker than the first thickness.

Also, the second bobbin part(320b) may have a double elevated platform with diameter decreasing.

The coil(350) is fixed on the second bobbin part(320b), and a gap is formed between the coil(350) and the second bobbin part(320b). The internal yoke part(224) of the yoke(220) is inserted in the gap. The magnetic field generated from the coil(350) and the magnet(210) is sheltered by the outer yoke (222), the internal yoke(224) and the connection yoke(226).

The upper direction force is generated by the magnetic field from the coil(35) and the magnet(210). Owing to the force the coil(350) and the bobbin(320) move to the upper direction of the base(100) from the base(100).

The upper spacer(400) is placed on the stator(200). For instance, the upper spacer(400) may arranged on the connection yoke(226) of the stator(200).

The upper spacer(400) includes a first spacer part(410) and a second spacer part(420).

The first spacer part(410) is formed along the rear side of the outer yoke(222) with a square frame shape, and the second spacer part(420) is extended from the first spacer part (410) along the upper side of the connection yoke(226). The end of the first spacer part(410) is contacted to the fixed pillar(105) of the base(100), and the first spacer part(410) is contacted to the end of the fixed pillar(105).

The bottom spacer(430) may be manufactured as a square frame shape, and is interposed between the base(100) and the magnet(210) of the stator(200).

The bottom spacer(430) fixes the upper flat spring(150) to the base(100) and insulates the bottom flat spring(140, described later) and the stator(200).

With referring the FIG. 3 again, the bottom flat spring(140) and the upper flat spring(150) elastically support the bobbin (320) of the rotor(300).

The bottom flat spring(140) and the upper flat spring(150) elastically generates the displacement to make the rotor move to the upward when the rotor(300) moves upward as compared with the stator(200). When the rotor(300) returns to the initial state the bottom flat spring(140) and the upper flat spring(150) support the stator(300) to fix the stator(300) at the designated position.

One end of the bottom flat spring(140) is interposed between the bottom spacer(430) and the base(100), and the other end of the bottom flat spring(140) is coupled with the out side bottom of the bobbin(320).

One end of the upper flat spring(150) is interposed between the second spacer part(420) of the upper spacer(400) and the connection yoke(226) of the yoke(220), and the other end of the upper flat spring(150) is coupled with the out upper side of the bobbin(320).

The bottom flat spring(140) and the upper flat spring(150) have very thin plate shape to generate the transform elastically against the external force. The bottom flat spring(140) and the upper flat spring(150) may include the metal plate with the thickness in the range of 30 μm~50 μm.

Referring to the FIGS. 1 and 3 again, the upper flat spring (150) includes the internal flat spring(151), the outer flat spring(152) and the connection flat spring(159).

The internal flat spring(151) of the upper flat spring(150) may have the curved surface when viewed from a plain surface. The internal flat spring(151) may elastically support the upper side of the bobbin(320) of the stator(300).

The internal flat spring(151) may have the ring shape when viewed from a plain surface, and there may be formed at least one connection hole(150a) at the internal flat spring(151) to be connected with at least one boss of the bobbin above. The internal flat spring(151) may be a thin metal plate with a thickness in the range of 30 μm~50 μm.

The outer flat spring(152) arranged outside of the internal flat spring(151), and the outer flat spring(152) has more large circular opening than the internal flat spring(151). The outer flat spring(152) has the opening adapted to form the internal flat spring(151) on a thin square metal plate.

The outer flat spring(152) is interposed between the upper spacer(400) and the yoke(220).

The connection flat spring(159) includes the first connection body(153), the second connection body(156) and the connecting part(158a).

The connection flat spring(159) is interposed between the internal flat spring(151) and the outer flat spring(152), and the connection flat spring(159) connects the internal flat spring(151) and the outer flat spring(152).

The first region(FR) and the second region(SR) placed in parallel with the first region(FR) is arranged in a space formed between the internal flat spring(151) and the outer flat spring(152).

With reference to FIG. 1, the first region(FR) and the second region(SR) are arranged on either side of the imaginary base line(L) extended from a center(O) of the internal flat spring(151) to the outer flat spring(152).

In some exemplary embodiments of the present invention, the first region(FR) and the second region(SR) arranged on either side of the imaginary base line(L) have substantially same area.

The first connection body(153) is interposed at the space between the internal flat spring(151) and the outer flat spring(152), may be the first region(FR).

The first connection body(153) arranged at the first region (FR) includes first parallel parts(154) and first curved parts(155).

The first parallel part(154) has a substantially same curvature as that of the internal flat spring(151). The number of first parallel parts(154) may be m (m is odd number more than 3). The number of first parallel parts(154) of the first connection body(153) may be 3 or 5. In the case of the embodiment, each first parallel parts(154) have same curvature, and a distance between each first parallel parts(154) are substantially same.

First curved parts(155) are connected with ends of each first parallel parts(154) to make first parallel parts(154) connected in series. The number of first parallel parts(154) is odd number more than 3. The number of first curved parts(155) may be n (n is even number more than 2) when the number of first parallel parts(154) is m. For example, two first curved parts(155) are formed when the number of first parallel parts(154) is 3; four first curved parts(155) are formed when the number of first parallel parts(154) is 5.

On account of at least three first parallel parts(154) and two first curved parts(155) connected with the ends of the first parallel parts(154), the first connection body(153) has similar form as 'S' shape when viewed from a plain surface.

In the case of the embodiment, the first connection body (153) formed with first parallel parts(154) and first curved parts(155) has designated length. The end of the first connection body(153) adjacent to the internal flat spring(151) is connected in one body with the internal flat spring(151).

The second connection body(156) is interposed in the space between the internal flat spring(151) and the outer flat spring(152); may be in the second region(SR). In the case of the embodiment, the second connection body(156) arranged in the second region(SR) has substantially same shape and size with the first connection body(153).

More specifically, the second connection body(156) arranged in the second region(SR) includes second parallel parts(157) and second curved parts(158).

The second parallel part(157) has substantially same curvature with the internal flat spring(151). The number of second parallel parts(157) may be m (m is odd number more than 3). The number of second parallel parts(157) of the second connection body(156) may be 3 or 5. In the case of the embodiment, each second parallel parts(157) have same curvature, and a distance between each second parallel parts(157) are substantially same.

Second curved parts(158) are connected with ends of each second parallel parts(157) to make second parallel parts(157) connected in series. The number of second parallel parts(157) is odd number more than 3. The number of second curved parts(158) may be n (n is even number more than 2) when the number of second parallel parts(157) is m. For example, two second curved parts(158) are formed when the number of second parallel parts(157) is 3; four second curved parts(158) are formed when the number of second parallel parts(157) is 5.

On account of at least three second parallel parts(157) and two second curved parts(158) connected with the ends of the second parallel parts(157), the second connection body(156) has similar form as 'S' shape when viewed from a plain surface.

In the case of the embodiment, the second connection body(156) formed with second parallel parts(157) and second curved parts(158) has designated length. The end of the second connection body(156) adjacent to the internal flat spring(152) is connected in one body with the internal flat spring(152).

The connecting part(158a) is formed in the space between the internal flat spring(151) and the outer flat spring(152). The connecting part(158a) connects an end of the first connection body(153) which has no connection with the internal flat spring(151) and an end of the second connection body(156) which has no connection with the outer flat spring(152). In the case of the embodiment, the first connection body(153), the second connection body(156) and the connecting part(158a) are connected as a whole.

The connecting part(158a) may have at least one fold in order to connect the first connection body(153) and the second connection body(156); the first connection body(153) and the second connection body(156) are folded at least once thus they may have a similar form as 'S' shape when viewed from a plain surface. In the case of the embodiment, the connecting part(158a) is folded twice.

In the case of the embodiment, the first connection body (153), the second connection body(156) and the connecting part(158a) are explained separately to help the clear explanation of the flat spring for the voice coil motor(150), however the flat spring for the voice coil motor(150) is formed from the thin metal plate with press work or etching work; thus the internal flat spring(151), the outer flat spring(152) and the connection flat spring(159) are formed as a whole.

Also, in the case of the embodiment, the connection flat springs(159) may be arranged in the space between the internal flat spring(151) and the outer flat spring(152) with four units with same interval.

In the case of the embodiment above the upper flat spring of the voice coil motor is explained for example, but a bottom flat spring(140) of the voice coil motor(800) may be applied using the structure of the flat spring explained with referring to FIG. 1 and FIG. 2.

The case(500) includes a first case part(510) and a second case part(520).

The first case part(510) arranged in parallel with the fixed pillar(105) of the base(100), and has the square frame shape. The through hole(515) which has hook joining with the fixed processus(107) of the fixed pillar(105) is formed on the first case part(510).

The second case part(520) is extended from the first case part(510) with the parallel direction to the second spacer part(420) of the upper spacer(400). The second case part(520) covers the second spacer part(420) of the upper spacer(400) and has an opening(525) exposures the bobbin(320).

As described above, the present invention changes the structure of the flat spring which elastically supports the bobbin installing the lens therefore the bobbin is supported more stably and the fatigue failure of the connection flat spring of the flat spring which drives repetitively by the bobbin is prevented.

The foregoing description of the preferred embodiment has been presents for the purpose of illustration and description. It is not intended to limit the scope of the invention. Still other variations and modifications are possible without departing from the spirit and scope of the present invention.

What is claimed is:

1. A flat spring for voice coil motor, comprising:
an internal flat spring;
an outer flat spring arranged outside the internal flat spring; and
a connection flat spring including a first connection body connected to the internal flat spring, a second connection body connected to the outer flat spring and a connecting part connecting the first and second connection bodies, where the first connection body and the second connection body are folded at least twice;
wherein a connection hole is formed at the internal flat spring, and the connection hole and the connecting part are oppositely formed in a radial direction of the internal flat spring.

2. The flat spring of claim 1, wherein the first connection body and the second connection body are arranged in parallel along a circumferential direction of the internal flat spring.

3. The flat spring of claim 1, wherein each distal end respectively connected to the internal flat spring and the outer flat spring in the connection flat spring is farthest formed from the connection flat spring.

4. The flat spring of claim 1, wherein a connecting part between the internal flat spring and the first connection body is formed at one lateral margin of the connection flat spring, and a connecting part between the outer flat spring and the second connection body is formed at the other lateral margin of the connection flat spring.

5. A flat spring for voice coil motor, comprising:
an internal flat spring formed in a curved surface;
an outer flat spring arranged outside the internal flat spring; and
a connection flat spring including a first connection body folded at least twice and interposed between the internal flat spring and the outer flat spring and a second connection body placed between the internal flat spring and the outer flat spring in parallel with the first connection body and has an identical shape with the first connection body and a connection flat spring comprising a connecting part connecting adjacent ends of the first and the second connection body,
wherein an end of the first connection body which has no connection with the connecting part is connected to the internal flat spring, and an end of the second connection body which has no connection with the connecting part is connected to the outer flat spring.

6. The flat spring of claim 5, wherein the first connection body is arranged at a first region and the second connection body is arranged at an adjacent second region when the first connection body and the second connection body has an identical area or an identical shape.

7. The flat spring of claim 5, wherein the connecting part is folded at least once.

8. The flat spring of claim 5, wherein the first connection body and the second connection body includes parallel parts arranged in parallel and curved parts connecting the parallel parts when curvatures of the parallel parts are same as those of the internal flat spring.

9. The flat spring of claim 8, wherein the number of parallel parts of the first connection body and the second connection body is m (m is odd number more than 3) and the number of curved parts is n (n is even number more than 2).

10. The flat spring of claim 8, wherein the distance between each of the parallel parts is uniform.

11. The flat spring of claim 8, wherein, a sum of lengths of the first curved parts at the first connection body, and a sum of lengths of the second curved parts at the second connection body are same.

12. The flat spring of claim 5, wherein each of the first connection body and the second connection body takes the shape of a letter 'S'.

* * * * *